(12) United States Patent
Maynard et al.

(10) Patent No.: US 7,503,521 B2
(45) Date of Patent: Mar. 17, 2009

(54) RADIATION HOMING TAG

(75) Inventors: John A. Maynard, Amherst, NH (US); James M. Ortolf, Chelmsford, MA (US); Mark A. Carlson, Amherst, NH (US); Paul D. Zemany, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 11/629,061

(22) PCT Filed: Feb. 7, 2006

(86) PCT No.: PCT/US2006/004530
§ 371 (c)(1),
(2), (4) Date: Dec. 8, 2006

(87) PCT Pub. No.: WO2006/086527
PCT Pub. Date: Aug. 17, 2006

(65) Prior Publication Data
US 2007/0205319 A1   Sep. 6, 2007

Related U.S. Application Data

(60) Provisional application No. 60/650,709, filed on Feb. 7, 2005.

(51) Int. Cl.
*F41G 7/00* (2006.01)
*G01S 1/00* (2006.01)
*F42B 15/01* (2006.01)
*G01S 13/00* (2006.01)
*F42B 15/00* (2006.01)

(52) U.S. Cl. .................. 244/3.16; 244/3.1; 244/3.11; 244/3.13; 244/3.15; 102/501; 102/513; 89/1.11

(58) Field of Classification Search ........... 244/3.1–3.3; 89/1.11; 102/501, 513
See application file for complete search history.

(56) References Cited

U.S. PATENT DOCUMENTS

| | | | | |
|---|---|---|---|---|
| 3,528,373 | A | * | 9/1970 | Wilenius et al. ............. 102/513 |
| 4,091,412 | A | | 5/1978 | Salonimer |
| 4,136,343 | A | | 1/1979 | Heffner et al. |
| 4,178,851 | A | | 12/1979 | Brady |
| 4,179,088 | A | * | 12/1979 | French ....................... 244/3.19 |
| 4,278,976 | A | | 7/1981 | Alpers et al. |
| 4,281,809 | A | * | 8/1981 | Oglesby et al. ............. 244/3.16 |
| 4,383,663 | A | | 5/1983 | Nichols |
| 4,448,106 | A | | 5/1984 | Knapp |

(Continued)

FOREIGN PATENT DOCUMENTS

GB    2029943    3/1980

*Primary Examiner*—Bernarr E Gregory
(74) *Attorney, Agent, or Firm*—Daniel J. Long; Sand & Sebolt; Michael Sand

(57) ABSTRACT

The homing tag (1) has a transmissive housing (3), which is attached to a cartridge case (5). The transmissive housing (3) includes an aft body (7) to provide an interface with the cartridge case (5). Rotating bands (9) are located at a leading edge of the aft body (7). The transmissive housing (3) further includes a central body (11). The ogive-shaped nose (13) is formed of transparent material. A pluralit of slots (15) are provided for cooling the transmissive housing (3).

13 Claims, 4 Drawing Sheets

U.S. PATENT DOCUMENTS

| | | | |
|---|---|---|---|
| 4,522,356 A | 6/1985 | Lair et al. | |
| 4,606,514 A | 8/1986 | Sundermeyer | |
| 4,711,412 A | 12/1987 | Wallermann | |
| 4,856,733 A | 8/1989 | Lachmann | |
| 4,867,034 A * | 9/1989 | Trosky et al. | 89/1.11 |
| 4,883,239 A | 11/1989 | Lachmann et al. | |
| 5,070,790 A * | 12/1991 | Le Parquier et al. | 102/513 |
| 5,260,709 A | 11/1993 | Nowakowski | |
| 5,280,751 A * | 1/1994 | Muirhead et al. | 102/513 |
| 5,350,134 A | 9/1994 | Crawford | |
| 5,467,940 A | 11/1995 | Steuer | |
| 5,478,028 A | 12/1995 | Snyder | |
| 5,631,654 A | 5/1997 | Karr | |
| 5,647,558 A | 7/1997 | Linick | |
| 5,661,257 A * | 8/1997 | Nielson et al. | 102/513 |
| 5,695,152 A | 12/1997 | Levy | |
| 5,824,939 A * | 10/1998 | Handelman | 89/1.11 |
| 5,826,819 A | 10/1998 | Oxford | |
| 5,931,410 A * | 8/1999 | Feierlein et al. | 244/3.19 |
| 6,244,536 B1 | 6/2001 | Cloutier | |
| 6,467,721 B1 | 10/2002 | Kautzsch et al. | |
| 6,621,059 B1 | 9/2003 | Harris et al. | |
| 6,650,277 B1 | 11/2003 | Wilkinson | |
| 6,762,710 B2 | 7/2004 | Wilkinson | |
| 6,842,138 B1 | 1/2005 | Wilkinson | |

* cited by examiner

RADIATION HOMING TAG

CROSS REFERENCE TO RELATED APPLICATION

This application claims rights under 35 USC 119(e) from U.S. application Ser. No. 60/650,709, filed Feb. 7, 2005; the contents of which are incorporated herein by reference.

BACKGROUND OF THE INVENTION

1. Field of the Invention

The present invention relates to armaments and more particularly to guided munitions. Even more particular, the invention relates to an optical homing tag for guiding the muntions to a target.

2. Background Information

Mortars and other forms of indirect munition fire are one of the most commonly employed weapons in a ground combat unit. Large guided munitions have been successfully developed and deployed but have generally required expensive vehicular platforms (fixed wing or rotary aircraft) or large caliber guns (ships or mobile howitzers) to deliver the munitions. These platforms and delivery systems may not be available to ground combat units, whose speed, mobility and agility contribute to their survivability. It is now feasible to miniaturize small caliber guidance and designation systems such that maneuverable ground combat units can be armed with precision guidance weapons.

Ground combat units commonly have small caliber armaments, including rifles, grenade launchers and mortars. Rifles are accurate direct-fire weapons, but challenging to integrate guidance or homing tags due to their small caliber (typically 5.66 mm or 223 caliber). Future improvements in power-density and electrical-to-radiated conversion efficiency may permit bullets to be used as homing tags. Presently, grenade launchers (20 and 40 mm) are large enough to integrate electronics and power supplies for homing devices. They are considered direct-fire, hence their placement accuracy is relatively good against targets. But they lack the volume to carry sufficient explosives to effect large areas or hardened targets. Conversely, mortars are indirect fire weapons which carry relatively large explosives and have sufficient volume for guidance capabilities.

The traditional role of mortars has been to provide close and continuous fire support for maneuvering forces. Military history has repeatedly demonstrated the effectiveness of mortars. Their rapid, high-angle, plunging fires are invaluable against dug-in enemy troops and targets in defilade, which are not vulnerable to attack by direct fires. One of the major disadvantages of mortars is their comparatively low accuracy, and as a result mortars are becoming less effective in today's precision combat environment. Equipping a mortar round with a precision guidance package will increase its accuracy, enabling the mortar to be a precision munition that will be significantly more effective in wartime situations. For maximum utility, the guidance package preferably should be an inexpensive retrofit to current munitions, with a cost in production that allows its use in all situations, either as a guided or unguided weapon.

Unguided munitions are subject to aim error and wind disturbances. These factors, along with other more subtle error sources, may cause the munition to miss the target completely or require many rounds to complete the fire mission due to the resulting large CEP (Circular Error Probability). Current approaches to guided weapons are expensive and are used on larger, long range weapons. The approach of the present invention disclosure results in significantly lower cost and smaller size. This allows use with small to medium caliber weapons and significantly improves CEP which also results in a significant reduction in the quantity of rounds required to complete the fire mission which in turn results in lower overall cost and improved crew survivability. In addition, another benefit to this approach is the virtual elimination of collateral damage due to errant rounds impacting non-targeted areas. Furthermore, complete integration of a seeker/guidance error can be used in a modification to the existing fuse in order to "safe" errant rounds which are failing to meet an established CEP ground rule which further controls unwanted collateral damage by preventing detonation of off target rounds.

Mortars are typically unguided or guided by an expensive G&C (Guidance and Control) system. The cost is high for current guided mortars and unguided mortars may have poor accuracy. Also, unguided mortars may result in unacceptable collateral damage, excess cost due to the large number of rounds required to blanket the target area, and may expose the mortar crew to counterbattery fire due to the large time required to drop the necessary shells to saturate the target.

One manner of guiding the munitions to a target is to provide a guidance signal for reception by a guidance and control assembly mounted in the nose of the munitions wherein the guidance signals emanate from an optical designator which is located at the target. This optical designator can be provided by a stand off illuminator which is aimed at the desired impact point of the target by a forward observer or by a manned or unmanned aircraft flying close to the target.

Although these various types of optical designators are satisfactory in certain respects, they have certain drawbacks in that it requires a forward observer to be close enough to the target to place the optical designator on the target such as by a laser beam, and requires that he has possession of the needed equipment. Also, this placement requires that the forward observer be close to the target which could alert the enemy at the target site of his presence and also result in injury to the forward observer. Thirdly, the forward observer must designate the target for a period of time, making themselves in turn open to detection or hostile attack. Other methods would require the need to have a plane in the air near the target, which again would alert the enemy at the target of an attack, possibly resulting in countermeasures being exerted on the forward observer and/or plane. Another type of optical designator can be an optical tag which is placed by some means at the target site. It is difficult to secretly place an optical designator at the target which would remain undetected by the occupants of the target until the munition is ready to be launched.

Therefore, there is a need for an accurate and cost effective target designator, and in particular a homing tag which can be placed at the target in a simple, effective manner by a soldier from a relatively safe distance just prior to launching of the munition to be guided thereby, which optical tag can be launched in a simple and effective manner by known types of munition launchers.

BRIEF SUMMARY OF THE INVENTION

The present invention is a tag for use in guiding munitions. The tag includes at least one emitting radiator which is modulated by means of a code at a specific frequency. A processing gain is thereby obtained which affords an increased munitions range.

Various types of radiators are possible today. A light emitting diode (LED) provides for low-cost, high conversion efficiency optical designation. A laser diode can further increase optical gain by selectively emitting energy in a narrow band, further reducing the effects of background radiation clutter. Efficiencies of laser diodes are improving, and an infrared (IR) diode would be compatible with the current inventory of optically guided munitions. Lastly, a radio-frequency emitter could be used with modulation gain, although RF guided munitions in the present military arsenal are just emerging.

A further aspect of the invention is to provide a homing tag which is integrated into a small rugged aerodynamic-shaped body formed of a material which houses the electronics including the emitter(s), which body has sufficient strength to protect the components from shock, and which provides acceptable levels of radiation transmittance. A preferable embodiment for an optical homing tag would be in a polymer housing transparent in the infrared (IR) frequency band selected for optimum signal-to-background clutter performance.

Another feature is to mount the radiating housing on a shell casing containing sufficient impulse to propel the optical tag to the target. In current embodiments, the housing would be mated to launch cartridges compatible with the small caliber guns commonly used by soldiers, such as 40 mm grenade launchers. Although aluminum crimped designs are prevalent today, the housing can be sized to be launched with emerging plastic or paper-fiber based cartridges from smaller caliber guns, such as 20 mm. Another possible form of launcher is a small rocket-based propellant that delivers a steady impulse once expelled by a small charge from the shoulder-carried launcher.

Still another aspect of the invention is to provide a setback switch which is used to prevent an internal battery in the housing from discharging except when the projectile is launched, and wherein the batteries for powering the radiating source or radiator can output a high pulse current for short periods of time. Pulse operation lengthens the operating life of the tag unit and for some types of radiators, such as LEDS, allows for overdriving the LEDS. Overdriving the LEDS shortens the tag lifetime to achieve a higher brightness from the LEDS.

Still another feature of the invention is to provide a thermal mass adjacent to the radiator to assist in maintaining the output power efficiency of the radiator as temperatures rise. Many radiators, such as LEDS have a temperature dependent efficiency and lifetime. Maximizing the heat capacity or cooling the radiator maintains homing tag lifetime until the power is consumed.

A further aspect of the invention is to provide the homing tag with low cost electronics which will implement the tag codes, which codes are manually set, for instance by a rotary switch, which will enable a code of the day (COD) to be easily and rapidly set which must correspond with a similar COD programmed into the munition to be guided by the homing tag to ensure that the guided munition is intended for a particular target.

Low cost manufacturing techniques can be achieved by embedding the homing tag within plastic permits. Molded plastics make the units disposable as well as reducing the likelihood that a tag could be reworked by hostile forces and reused as a diversionary beacon. Embedding the battery and electronics in a solid plastic housing makes the unit non-repairable.

BRIEF DESCRIPTION OF THE SEVERAL VIEWS OF THE DRAWINGS

The optical form of the present invention is referenced in the attached drawings.

Similar numbers refer to similar parts throughout the drawings.

DETAILED DESCRIPTION OF THE INVENTION

Figure 1:
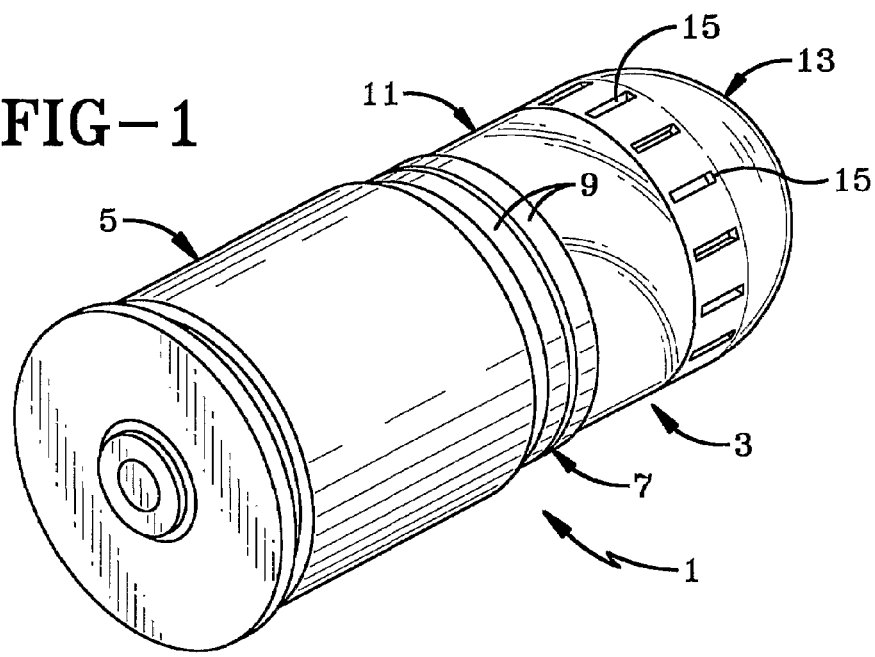
FIG. 1 is a perspective view of the optical homing tag which is the preferred embodiment of the present invention.
Figure 2:
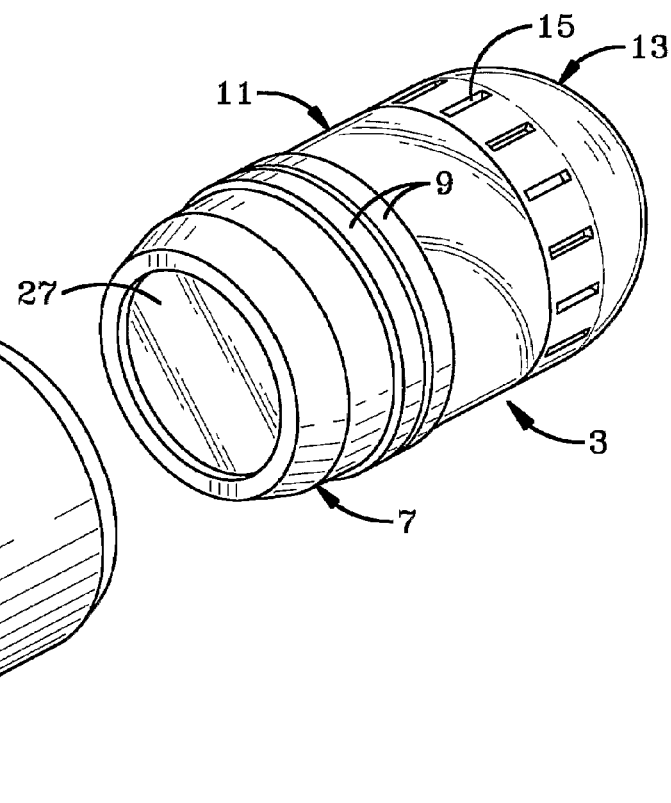
FIG. 2 is a perspective view of the transmissive housing of the homing tag separated from its cartridge case.
Figure 3:
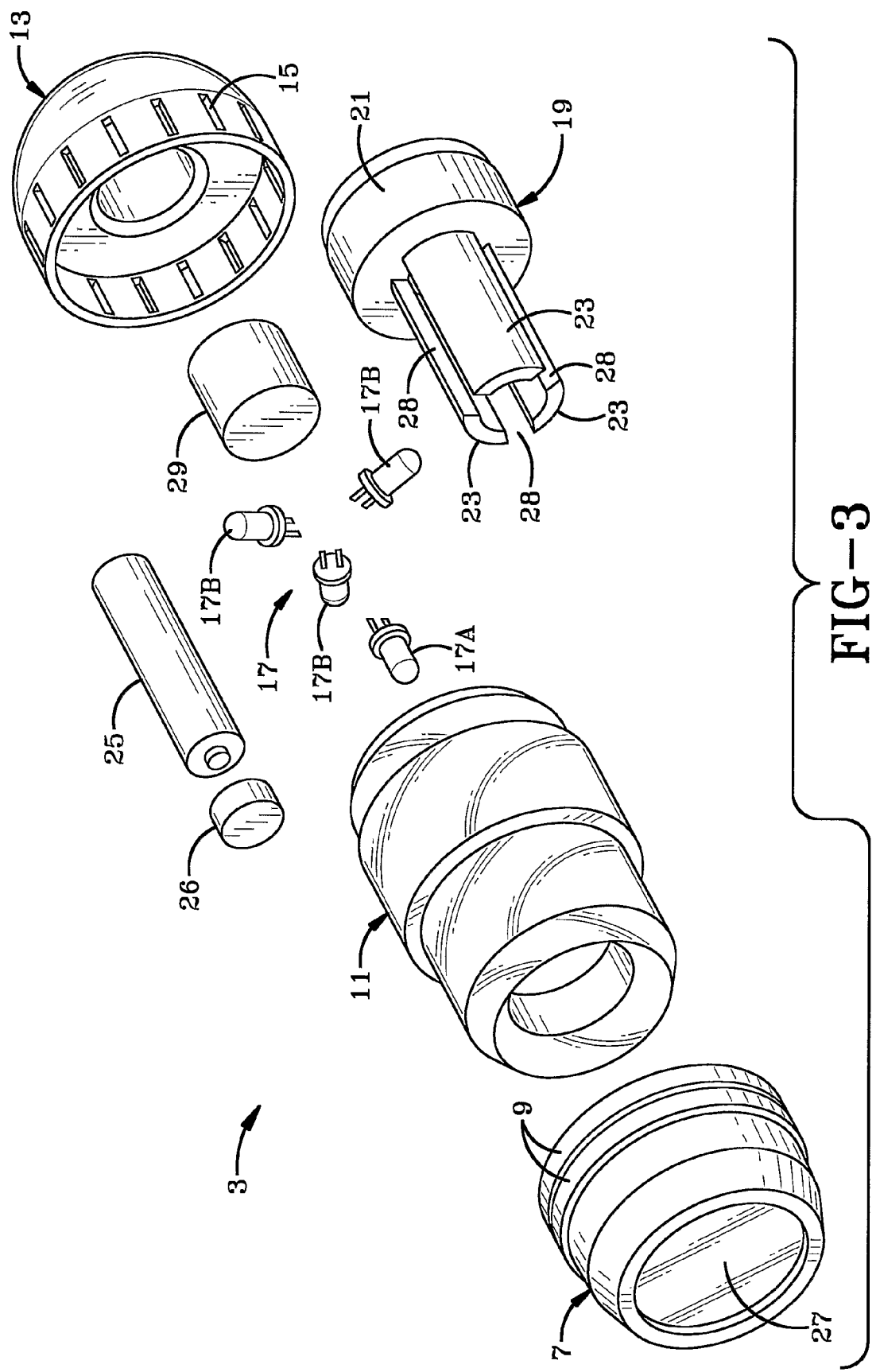
FIG. 3 is an exploded perspective view of the optical homing tag shown in FIG. 1.
Figure 4:
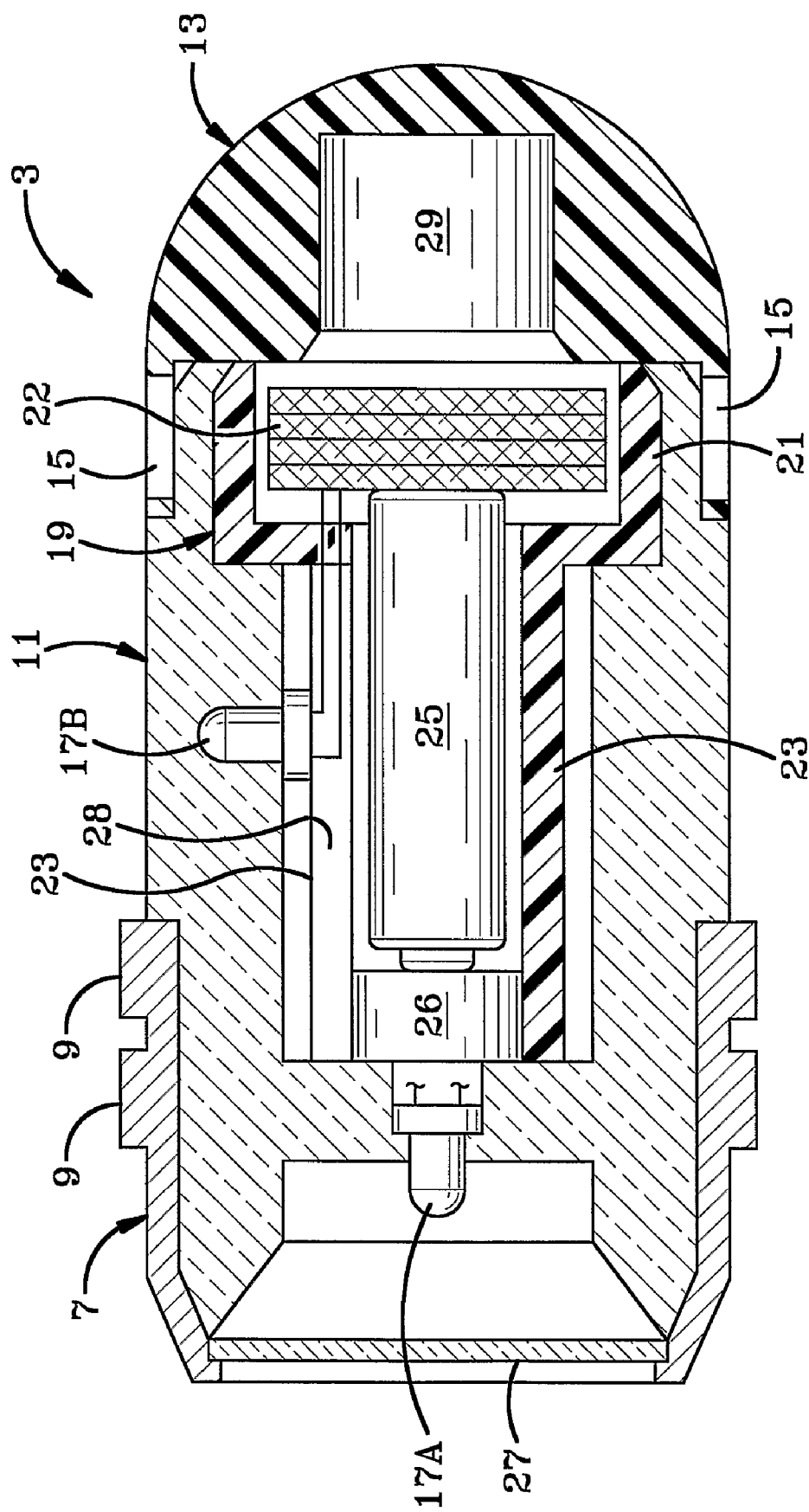
FIG. 4 is a diagrammatic cross-sectional view of the optical homing tag.

The optical version of a homing tag which is the preferred embodiment of the present invention is indicated generally at 1, and is intended to be placed near or on a target position, in one instance as a 40 mm grenade as shown in FIG. 1. Optical homing tag 1 includes a transmissive housing indicated generally at 3, which is attached to a cartridge case 5, which contains an impulse charge for propelling the optical housing to a target. The housing includes an aft body 7 to provide an interface with the cartridge case 5, typically by a crimp joint. Rotating bands 9 are located at a leading edge of aft body 7 which enables the optical housing to engage the riflings of a barrel when used with certain types of launch equipment, providing an aerodynamic spin to the housing as it leaves the barrel of the launcher to ensure proper flight dynamics. The boat tail design of aft body 7 as shown in FIG. 3, minimizes aerodynamic drag as the optical housing moves through the air toward a target.

Housing 3 further includes a central body 11 formed of a high strength polymer material such as polycarbonate or an acrylic. An ogive-shaped nose 13 is mounted on the forward end of central body 11 and is formed of an optical transparent material. A plurality of slots 15 are formed around a lower end of nose 13 to provide cooling air for housing 3 and to enhance a light source contained therein. The light source or radiator, preferably is an array of LEDS 17 located within central body 11. The ogive design of nose 13 achieves several functions. The aerodynamic shape and design is required for the ballistic match with the tactical rounds. Human interfacing occurs when the user selects the desired code. In one embodiment, that interface could be a rotary switch with which the user pulls and rotates the nose to select the code of the day.

Figure 5:
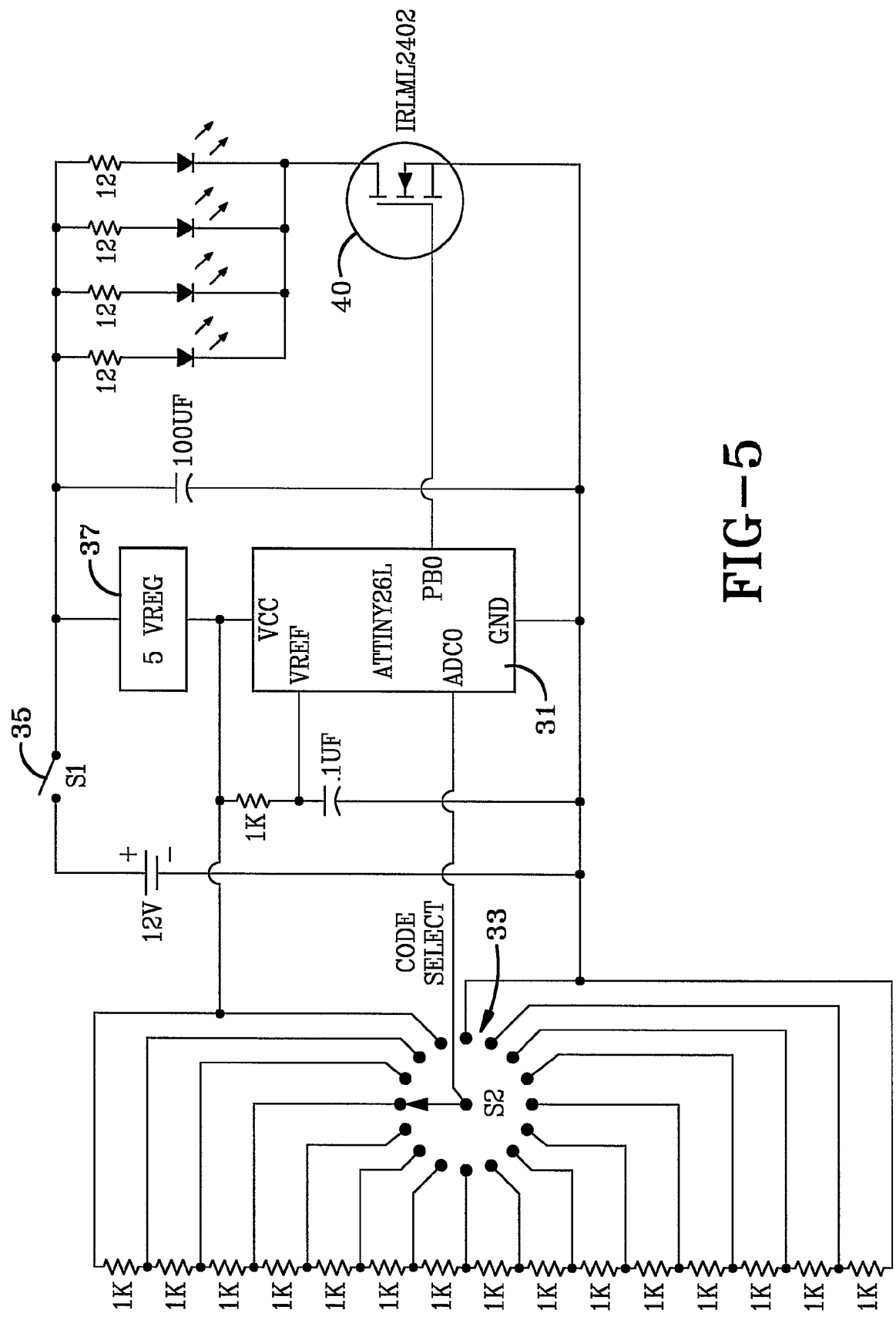
FIG. 5 is a schematic drawing of a preferred embodiment of an electronic control circuit used in the optical homing tag of the present invention.

A potted electronic assembly 19 also is mounted within nose 13 and body 11 and includes a cylindrical housing 21 formed of a high strength plastic material, which contains a printed circuit board 22. The details of the circuit board are shown in the circuitry of FIG. 5. A plurality of elongated angular tabs 23 extend outwardly from the back of electronic housing 21 between which is inserted a battery 25. Battery 25 is electrically connected to and provides the power to circuit board 22 contained within housing 21. A battery terminal 26 which is electrically connected to the control circuit is located at the positive terminal of the battery. Battery 25 preferably is a non-rechargeable power source, such as an alkaline battery, and is selected for its ability to output a high pulse current for a short period of time. It is intended for a short operational life having a minimum of 2 minutes of operation time until it is drained.

The plastic material which forms electronic housing 21 and central body 11 is of a clear high strength polymer material and has sufficient strength to protect the components contained therein from shock, and also has acceptable levels of optical transmittance in the designed frequency band. If a near infrared (IR) guidance round is in use, the preferred materials are polycarbonate and acrylic, although other materials could be used that have good transmittance in the near IR frequency band. Polycarbonate is an ideal material from an impact resistance and temperature range standpoint.

LED array 17 preferably is comprised of four LEDS. LED 17A is mounted in an aft end of central body 11 and is positioned within a hollow interior of aft body 7 closely adjacent a clear plastic lens 27 mounted at an open end of body 7. The other three LEDS 17B are mounted on electronic assembly 19 and located in slots 28 formed between tabs 23, and are electronically connected to circuit board 22 located within housing 21. LEDS 17B are located just outside the outside diameter of central body 11 so that the polymer layer is extremely thin at the tip of the LEDS to maximize transmittance.

Circuit board 22 preferably is a flex circuit and is folded into a compact configuration to fit within housing 21. It contains a code select chip and a rotary switch 33. A setback switch 35 also is provided in the control circuitry as shown in FIG. 5 to prevent the battery from discharging except when the projectile is launched.

The LEDS of array 17 preferably are flashing and operate at a high signal-to-clutter gain wavelength and feature user selectable codes and emit the design radiation band, such as an invisible near infrared (800 nm) band during operation. One of several additional codes are selectable from a human-indexed array of choices which are available through factory programming. Visible light also could be used as desired although the invisible infrared is preferred so as not to disclose the presence of the homing tag at the target site. A thermal mass 29 is located at the back of the LEDS to help maintain output power efficiency as the temperature of the LEDS rises, and to assist in balancing the weight and location of the center of gravity of housing 3. The simple circuit design as shown in FIG. 5 keeps the cost of homing tag 1 relatively low. The circuit is made for short operational life running on the non-rechargeable disposable battery 25 which is able to output a high pulse current for a short period of time. LEDS 17 will be bright at the start, but as the battery ages, their brightness will fade. This approach intentionally overdrives the LEDS at several times their recommended current levels for higher brightness. This makes use of the intended short life of the homing tag to take advantage of the high brightness that can be achieved through overdriving.

As shown in FIG. 5, the circuit has a minimum number of active components, the main one of which is a low cost digital controller, such as a microcontroller or application specific integrated circuit (ASIC) 31. An example of the microcontroller is a model ATtiny 26 produced by Amtel Corporation, which implements the planned pulse-rate-frequency (PRF) coding. The user can manually set the tag code by causing a selection of a proper voltage divider position. In the preferred embodiment, a rotary switch 33 is built into the electronic circuitry of the homing tag enabling the user to manually select a digital word by rotating nose 13 eliminating additional parts associated with a voltage divider circuit. A setback switch 35 is activated when the projectile is fired so that the powerup circuit always occurs in flight. This prevents inadvertent activation of the tag power source which lends an additional level of safety to the tagging procedure. Controller 31 modulates the LED array using a power switch 37, typically performed by a MOSFET-based circuit. Since only a few kilobits of programmed code is needed in controller 31 it enables a very low cost and simple circuitry to be utilized. The circuitry as shown in FIG. 5 will also include the necessary resistors, capacitors and a power rectifier 40 as shown in FIG. 5, easily determined by one skilled in the art.

In summary, the improved radiation homing tag of the present invention provides a simple, low cost effective device which can be launched toward a target site for guiding munitions towards a target with readily available weapons, such as shoulder fired grenade launchers, small mortar launchers etc. thereby avoiding the need of a spotter plane or forward observer equipment with laser equipment. Furthermore, the radiation homing tag is equipped with an adjustable code which can be set just prior to launch so as to correspond with the same code programmed into the guided munition to ensure that the guided munition and target are compatible. Also, the electronics for controlling the code and pulsing of the radiation source which is a plurality of point sources, such as LEDS, is simple and can be provided on a small compact circuit board secured within a rugged outer housing. Furthermore, the radiation source preferably is infrared making it invisible to the human eye thereby reducing the possibility of its detection; and in which the battery is set to overdrive the normal power limits of the LEDS, thereby providing an increased brightness for a relatively short period of time, which is sufficient for the munition to be guided to the target. Also, the radiator housing which contains the point sources of radiation, electronic circuitry and associated switches can be mounted on a usual projectile casing for launching by standard equipment such as a 40 mm grenade launcher. However, other types of launchers can be utilized without affecting the concept of the invention. Furthermore, the particular arrangement of the point sources could vary from that shown in the drawings and discussed above. Also, a setback switch ensures greater reliability by allowing the battery to be activated for powering the control circuitry only after the tag has been launched toward the target. A high strength and higher density material is selected for aft body 7, such as stainless steel, in order to match the flight weight of the radiator housing, as well as to protect the housing from high G impact acceleration. In particular, the radiator housing 3 interface between the cartridge case and the nose is sealed and ruggedized to ensure function even in the most severe environments. The mechanical rifling engagement feature provided by rotating bands 9 of aft body 7, can be used to ensure that projectile spin is transmitted to radiator housing 3 when the housing spins up, ensuring proper flight dynamics.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A radiation homing tag for guiding a munition having a code toward a target comprising:
 a cartridge case containing an impulsive charge;
 a transmissive housing containing at least one radiating source connected to the cartridge case;

a controller located in the transmissive housing for generating a code adapted to match the code in the munition to be guided by the homing tag; and a power source for supplying power to the controller and radiating source.

2. The radiation homing tag defined in claim 1 wherein the transmissive housing includes an aft body, a central body and a nose.

3. The radiation homing tag defined in claim 2 wherein the aft body has a sealing interface and is secured to the cartridge case by a crimp joint.

4. The radiation homing tag defined in claim 3 wherein the aft body includes a transparent lens; and in which the radiating source includes a plurality of point sources, one of which is located adjacent the transparent lens.

5. The radiation homing tag defined in claim 3 wherein the aft body includes at least one rotating band adapted to engage the rifling of a launch device.

6. The radiation homing tag defined in claim 2 wherein the central body is formed of a polymer material.

7. The radiation homing tag defined in claim 6 wherein the polymer material of the main body is a polycarbonate or an acrylic.

8. The radiation homing tag defined in claim 2 wherein the controller is part of a potted electronic assembly mounted adjacent the nose of the transmissive housing.

9. The radiation homing tag defined in claim 8 wherein the potted electronic assembly includes a printed circuit mounted within a protective housing; and in which the radiating source is a plurality of point sources electrically connected to the printed circuit.

10. The radiation homing tag defined in claim 2 wherein a plurality of openings are formed in the nose of the transmissive housing to enhance the radiating source and provide cooling to said radiating source.

11. The radiation homing tag defined in claim 1 wherein the code is a digital code selectable from a human-indexed array of choices.

12. The radiation homing tag defined in claim 1 wherein the power source is a disposable battery.

13. The radiation homing tag defined in claim 1 including a setback switch which is actuated when the transmissive housing is launched to activate the power source.

* * * * *